United States Patent
Clifton et al.

(10) Patent No.: US 7,600,051 B2
(45) Date of Patent: Oct. 6, 2009

(54) AUTONOMIC HARDWARE-LEVEL STORAGE DEVICE DATA INTEGRITY CHECKING

(75) Inventors: John Mark Clifton, Hertford (GB); Jonathan Ian Settle, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 10/865,286

(22) Filed: Jun. 10, 2004

(65) Prior Publication Data

US 2005/0138223 A1    Jun. 23, 2005

(51) Int. Cl.
*G06F 3/00* (2006.01)
*G06F 13/00* (2006.01)

(52) U.S. Cl. .............. 710/6; 711/163; 714/54; 714/100

(58) Field of Classification Search .......... 710/5–6; 714/54, 100; 360/31; 711/112, 163
See application file for complete search history.

(56) References Cited

U.S. PATENT DOCUMENTS 6,903,887 B2 *  6/2005  Asano et al. ............... 360/31
7,007,141 B2 *  2/2006  Li et al. ..................... 711/162
2002/0144057 A1 * 10/2002  Li et al. ..................... 711/112

* cited by examiner

*Primary Examiner*—Christopher B Shin
(74) *Attorney, Agent, or Firm*—Dillon & Yudell LLP (57) ABSTRACT

A system and method for autonomically monitoring data integrity during logical and physical storage and retrieval of data by a storage device. In one embodiment, the method of the present invention includes scheduling data integrity checking in accordance with an operative input/output (I/O) state of the storage device. The scheduling preferably includes first retrieving an I/O command, such as a read or write command, from a disk interface controller and determining whether or not the I/O command has been pre-marked for data checking. In response to the I/O command not being marked for prescribed data checking, a further determination is made of whether or not data integrity checking is required in association with the object I/O command as specified by scheduler rules. Responsive to determining that a data integrity check is required in association with the I/O command, the I/O command is marked as requiring an associated data integrity check.

19 Claims, 5 Drawing Sheets

AUTONOMIC HARDWARE-LEVEL STORAGE DEVICE DATA INTEGRITY CHECKING

PRIORITY CLAIM

This application claims priority of Great Britain Patent Application No. 0329174.7 filed on Dec. 17, 2003, and entitled, "AUTONOMIC HARDWARE-LEVEL STORAGE DEVICE DATA INTEGRITY CHECKING."

1. FIELD OF THE INVENTION

The present invention relates to deployment of data integrity checking by storage media drive devices, such as magnetic disk drives.

2. BACKGROUND OF THE INVENTION

Computer data storage devices, such as magnetic disk drives, typically include some form of error checking and correction functionality such as the well-known Error Checking and Correction (ECC) deployed at the disk device firmware level. In the present state of the art, other types of error checking executed in accordance with flexibly determined criteria are typically performed by controller or higher-level system devices. As a consequence, data integrity checking below the controller on the data link between a host system and the disk surface is limited to conventional ECC that is automatically and inflexibly deployed. The passing of the data between the controller and the disk surface via disk read and write commands thus introduces opportunities for data corruption for which there is no flexibility of checking and/or response options.

It would therefore be desirable to have a method and system for deploying and scheduling data integrity checking whereby these limitations may be alleviated.

3. SUMMARY OF THE INVENTION

The present invention accordingly provides, in a first aspect, a data storage device having a storage medium and a disk drive for manipulating the logical and physical storage and retrieval of user data on said storage medium, and further including a processor and associated data storage adapted to download and store rules and checking algorithms in association with the operation of the disk drive. Specifically, the processor and storage device are integrated in communicative association with the hardware level disk drive device to execute one or more checking algorithms selected and scheduled in accordance with checking selection and scheduling rules. The rules selectively deploy the checking algorithms as determined by relations or correlations pertaining to the operating state of the storage device with respect to the object user data as being written to the storage medium, read from the storage medium, or remaining non-accessed on the storage medium.

In a second aspect, the present invention provides a method of operating a storage device, such as a magnetic hard disk drive (HDD), having a storage medium and associated disk drive components for manipulating the logical and physical storage and retrieval of data on the storage medium. The method includes downloading and storing scheduling rules and data checking algorithms in communicative association with the disk drive control and processing electronics. One or more data integrity checking algorithms may be executed in accordance with the selection and scheduling of the algorithms as determined by the scheduling rules and the operative state of the disk drive. The scheduling rules determine both the timing and type of data checking function to be performed in accordance with the operative state of the storage device with respect to user data. The scheduling of data checking may determined by the state of the user data on the storage medium as being stored on or retrieved from or being non-accessed (i.e. remaining statically) on the storage medium. The scheduling of data checking may also, or in the alternative, be determined in accordance with a disk drive access to a specified area of the storage medium; a current input/output (I/O) data transfer rate to or from the disk drive; and/or the amount of data transferred for a given disk drive I/O operation.

All objects, features, and advantages of the present invention will become apparent in the following detailed written description.

5. DETAILED DESCRIPTION OF THE PREFERRED EMBODIMENT

The present invention is generally directed to increasing flexibility to the means and process by which error checking between the system interface controller and disk storage medium is performed. One particular benefit of the preferred embodiments of the present invention is that the response(s) to data errors discovered by the checking algorithms can be determined and defined according to the circumstances under which such errors are found. This invention thus advantageously adds increased flexibility to the way in which error checking is carried out.

The present invention is more specifically directed to a system and method for performing data integrity checking under two distinct sets of conditions: when the disk is idling; and, during read/write I/O operations. In a preferred embodiment, a set of one or more checking algorithms and a set of one or more rules defining the conditions under which to run the checks are passed to the storage medium in communicative contact with the hardware level disk drive device, enabling the object disk to self-manage the data integrity process. In this manner, the data integrity checks executed at times determined by the scheduler rules that determine both the times of execution and the particular checks in accordance with the current operative state of the drive.

The rules allow the disk to perform error checking and preferably to initiate error recovery actions autonomically, based on rules that specify one or more error checking algorithms to execute responsive to specified drive operation events or particular combinations of such events occurring in the course of the disk drive's handling of data.

It is known in the art to have a means by which a disk may be formatted with an integrity check pattern at initialization time. This is done automatically and without regard to the operative status of the disk drive to initialize the disk with the correct block size and data seeding for the integrity check. In contrast, and in a preferred embodiment of the present invention, a new command (maintained, for example, in the device command set) is executed to deliver a data package containing a set of one or more data checking modules to be used to perform integrity checking of the object data, and further containing a set of one or more rules, together forming a data check scheduler, to determine which of the available checking modules will be executed and when and in which sequence the checks are to be made. The data checking package is sent by the disk interface controller to the disk via its normal communication protocol. It is envisaged that this command is available for use at any time after disk initialization so that changes in the means and timing of the self checking can be made by a system administrator dynamically if, and when, the nature of the data or the operative condition of the object disk(s) changes.

When a data checking package is received and loaded in the disk drive storage and processing unit, the code and data therein may be stored by the storage medium such as on the physical platter of the disk, or if speed is an issue, the package could be maintained in an alternative non-volatile memory device such as a read-only memory device.

Syntax checking is preferably carried out on the package's contents to make sure that no errors have occurred that have corrupted the contents of the package. This could be implemented in stages at both the controller and disk sides.

The data checking scheduler rules utilized in a preferred embodiment include the following:

An I/O access (e.g., Read or Write operation) to one or more specified logical or physical areas of disk triggers a data check process, wherein responsive to an I/O access to one or more sections/logical block addresses (LBAs) of the object disk, the scheduler invokes one or more data checking modules.

An I/O data transfer rate triggers a data check process, wherein a pre-specified threshold I/O data transfer rate is pre-specified and included as at least one criterion for selecting one or more of the checking modules to deploy in testing the transferred data.

Scheduled absolute time intervals used as demarcation for when to trigger one or more associated data integrity checking process(es). This requires the disk drive or associated circuitry to include a clock or other timing device to provide global temporal information input to the object scheduler rule(s). Alternatively, a controller could use its own timing device or arrangement to send a new rules package at the beginning and end of the time period, e.g., at 9:00 am remove some checks for speed of I/O rate, at 5:00 pm replace the removed checks.

Write operations over a certain size trigger one or more associated data checking processes.

User preference(s) entered as criteria utilized by the scheduler rule(s) to select applicable checking processes and/or the timing of execution of the data checks. It may be determined that certain checks supersede other checks, requiring sequenced selection in accordance with the prioritization. For example, a company policy may define a minimum level of data integrity checking that needs to be regularly performed on certain types of data such as customer profile data that may be regularly accessed.

In a preferred embodiment, the data integrity checking modules/processes scheduled in accordance with the aforementioned scheduler rules include Error Checking and Correction (ECC), Longitudinal Redundancy Check (LRC), and Cyclic Redundancy Check (CRC).

The following is a pseudo-code representation of a scheduler rules file in a preferred embodiment of the present invention.

---

PosOnDisk(startLba=>"1",endLba=>"1000",checksToRun=>"1,3",onError=>"check_condition")
If write or read is to LBA lying between 1 and 1000, run checks 1 and 3 above, if an error is found, send check-condition. In an important feature of one aspect of the present invention, this type of scheduler rules file correlates the type of data transfer operation with a specified affected disk area to select which data check(s) to run in response.
WriteBlock(checksToRun=>"2",onError=>"sendFailResponse")
When writing data run check 2 and send a fail message if an error is found.
IOQueueLength(QLength > 3,checksToRun=>"")
If the I/O queue is greater than 3 don't run any checks.
OnIdling(ForTime > 500,checksToRun=>="2")
If idling for longer than 500 ms run check 2 on the whole disk.
(preference to checking certain LBAs could be specified). This process is known as 'data scrubbing'.

---

Some form of prioritized sequential arrangement determining the order of application of the scheduling rules and/or scheduling criteria contained therein is preferably implemented as a part of the data check scheduling method of the present invention. Furthermore, certain known protocols define different possible error response codes and pre-processing may be performed on the controller side to speed interpretation by the storage medium upon receipt. Finally, the method of the present invention may include an option to check/verify the data checking modules and/or associated scheduler rules following and responsive to a disk reset to verify that the checking functions stored on the disk remain valid.

Figure 1:
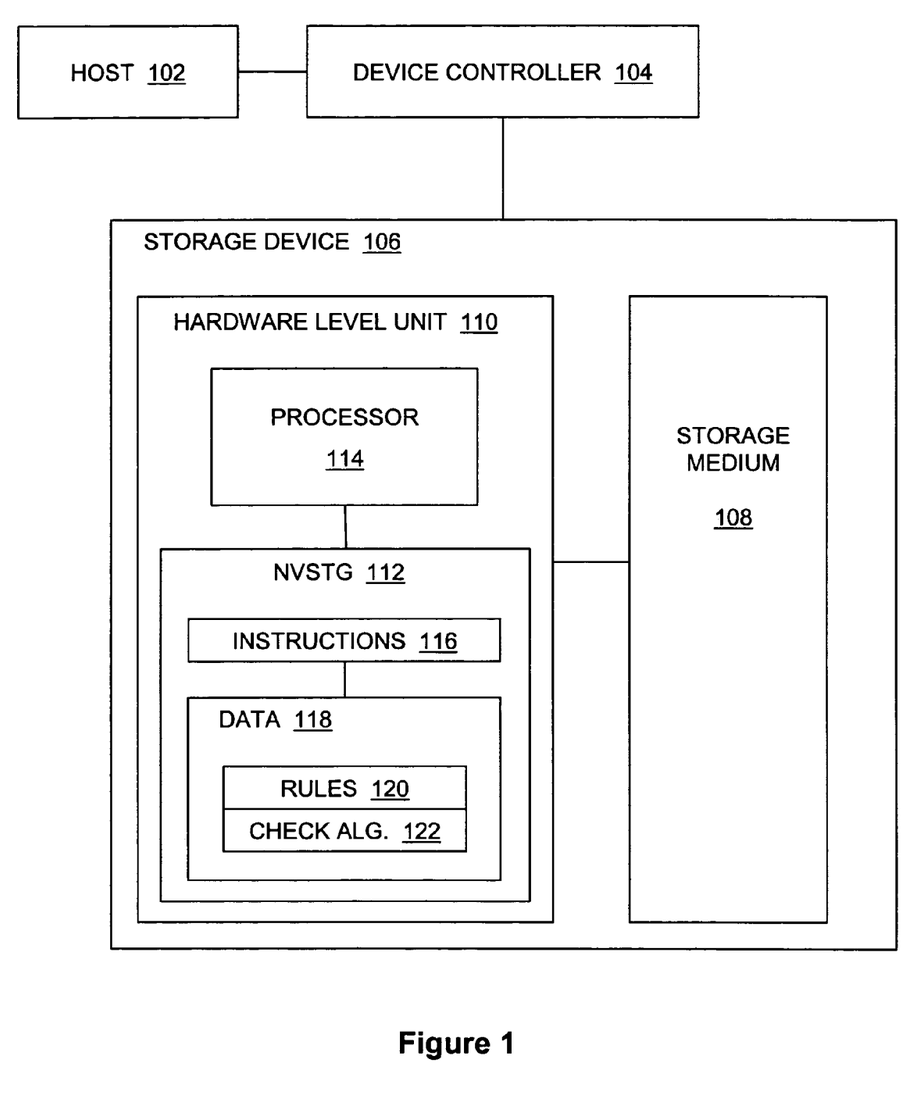
FIG. 1 is a block schematic representation illustrating a system according to a preferred embodiment of the present invention.

In an exemplary embodiment, and referring now to FIG. 1, there is shown a host computing system ("host" in the sense that it is a user of a storage device) 102 attached to a device controller 104. As is well-known in the art of disk drive interfaces, device controller 104 is typically a chip and associated circuitry responsible for controlling a data storage device such as storage device 106 in the depicted embodiment. Different types of controllers may be utilized, depending on the system interface (e.g., an IDE interface requires an IDE controller and a SCSI interface requires a SCSI controller). Storage device 106 comprises storage media (for example, magnetic or optical disks) 108, and a hardware level disk drive unit 110 for providing and controlling access means such as data read/write heads and manipulating the logical and physical storage and retrieval of data. The physical means for accessing data from devices and manipulating the logical and physical storage and retrieval of data are well-known in the art and need not be further described here. The hardware level disk drive unit 110 further includes storage, preferably non-volatile random access memory (NVRAM) storage 112 communicatively coupled to a processor 114. Processor 114 is adapted to receive and store instructions 116 and data 118 and to select and execute stored instructions by reference to a set of one or more scheduling rules 120 and data checking algorithms 122 forming part of data 118. As explained in further detail below, scheduling rules 120 are utilized to select from among one or more checking algorithms 122 in accordance with one or more key criteria pertaining to the operative state of storage device 106 and/or relation of the object data (e.g., data being written, read, or statically stored) to storage device 106.

Processor 114 may be a general-purpose processor running an operating system and other programs, and instructions 116 may comprise relations and interactions in a software or firmware code. In an alternative embodiment, processor 114 may be a hardware logic device (such as an EEPROM) that is capable of receiving reusable logic settings and operating on them responsive to periodic changes thereon. The logic settings may be represented in a hardware description language, or in the form of other logic gate setting instructions or means.

Figure 2:
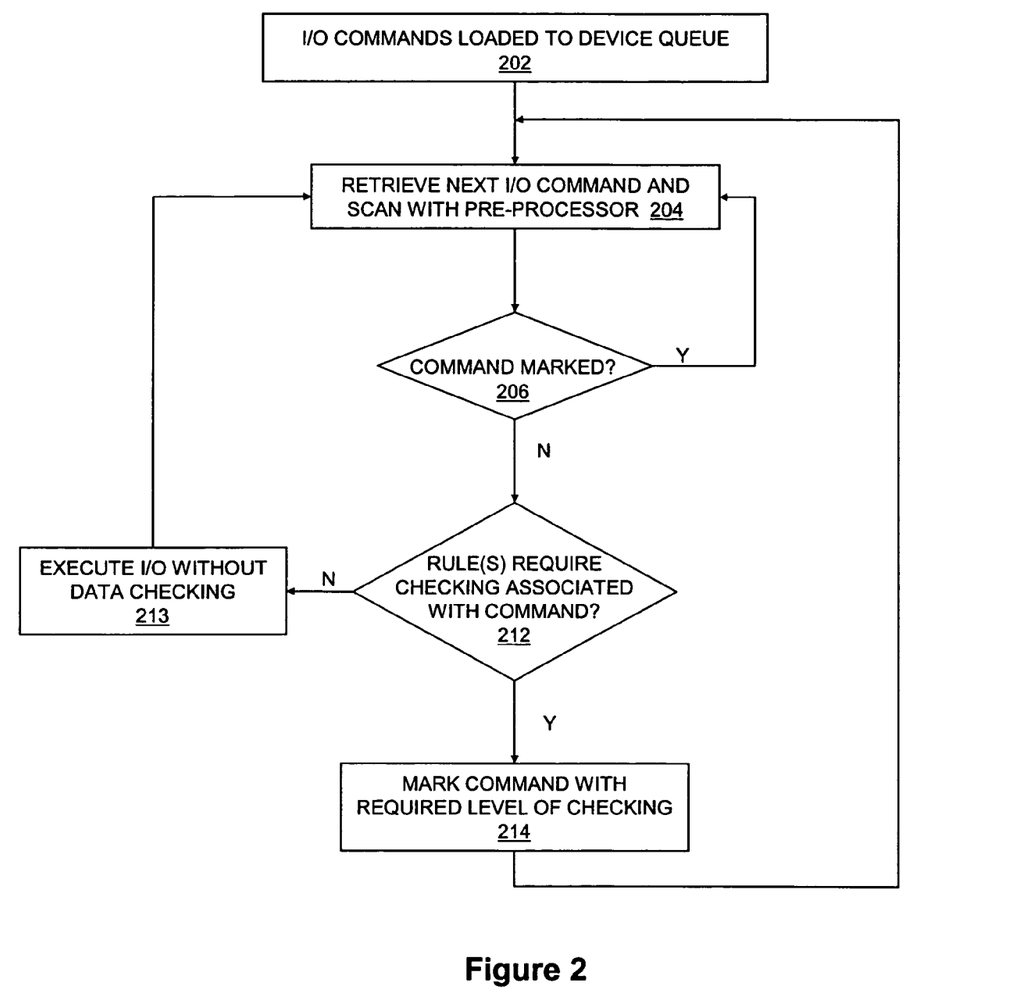
FIG. 2 is a simplified flow diagram depicting a method for evaluating I/O commands as part of the data integrity checking method of the present invention.

Referring now to FIG. 2, there is shown a simplified flow diagram depicting a method for evaluating I/O commands as part of the data integrity checking method of the present invention. As depicted at step 202, I/O commands (typically READ, WRITE, REWRITE or the like) are placed on a device queue for execution. A next I/O command is retrieved from the queue and scanned with a pre-processor as illustrated at step 204. If, as shown at steps 206 and 204, the I/O command has been marked (with a token, for example) for system-prescribed data integrity checking, a next command is processed and the method proceeds in a continuous loop between steps 204 and 206 while this system default "marked for checking" condition remains. If, as shown at steps 206 and 212, the next-retrieved I/O command is not marked as for data checking, one or more of the set of scheduler rules 120 are retrieved and examined/executed to determine whether or not data checking for the unmarked I/O command is required. It should be noted that the scheduler rules criteria for determining whether the object command requires checking of its associated data are those described above as depending on the operative state of the storage device as determined by the command. Responsive to a negative determination at step 212 (i.e., examination or execution of the scheduling rule(s) indicates no checking required), the I/O command is executed without associated data checking and a next I/O command is retrieved (steps 213 and 204). Responsive to a determination at step 212 that data checking in association with the object unmarked I/O command is required, then as illustrated at step 214 the I/O command is marked with the level of checking that has been determined by scheduler rules 120 to be required in association with its execution and the flow returns to step 204. In a preferred embodiment, the marking of the I/O command serves as a flag to call one or more of the checking modules selected as per the determination made at step 212.

Figure 3:
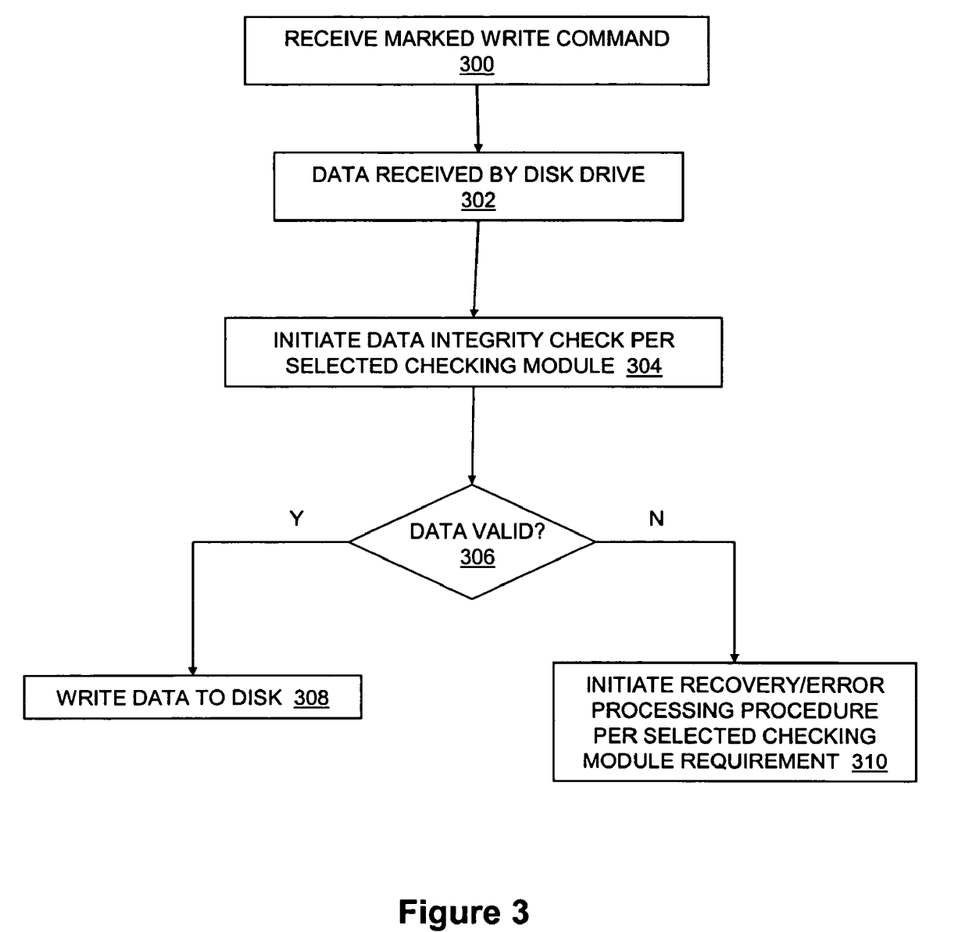
FIG. 3 is a simplified flow diagram illustrating method steps performed as part of data integrity checking at data write time in accordance with one embodiment of the present invention.

Referring to FIG. 3, there is depicted a simplified flow diagram illustrating method steps performed as part of data integrity checking at data write time in accordance with one embodiment of the present invention. The process begins as illustrated at steps 300 and 302 with write data received by the disk device in association with a write command marked as per steps 212 and 214 of FIG. 2. Next, as shown at step 304, the disk drive device performs a check on the data using the one or more data integrity checking algorithms (ECC, LRC, or CRC, for example) selected from among modules 122 by scheduling rules 120 and called or otherwise indicated by the marking. Responsive to the object data being verified by the selected checking algorithm(s) as "good," "valid," etc. (step 306), it is written onto the disk (step 308) and the integrity checking pattern is applied to it for later use according to any of the selected checking algorithms. If, responsive to the check at step 304, the data is found to be incorrect, corrupt, invalid, etc. at step 306, the disk device preferably initiates a recovery or other error processing procedure that has been selected in accordance with the selecting checking module(s) requirements (step 310).

Figure 4:
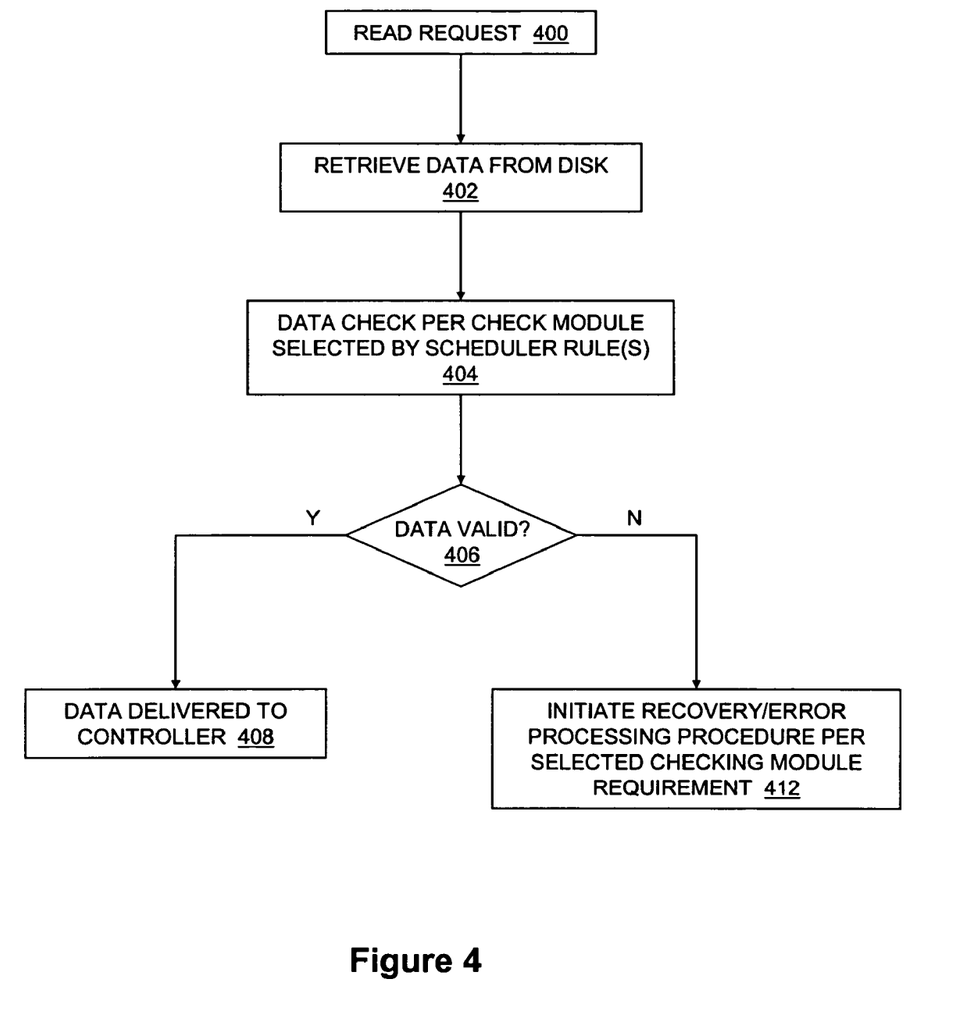
FIG. 4 is a simplified flow diagram depicting method steps performed as part of data integrity checking at data read time in accordance with one embodiment of the present invention.

With reference to FIG. 4, there is illustrated a simplified flow diagram depicting method steps performed as part of a data integrity checking process at data read time in accordance with one embodiment of the present invention. The process begins as shown at step 400 with a read request marked as per steps 212 and 214 of FIG. 2 and received by the disk drive device, followed by the drive retrieving the associated read data as shown at step 402. Next, as depicted at step 404, the disk drive device performs a data integrity check utilizing one or more modules selected from the checking modules 122 as identified/selected by scheduler rules 120. Responsive to the data checking results indicating the retrieved data good/valid, the data is delivered to the drive interface controller as shown at steps 406 and 408. If, as depicted at steps 406 and 412, the data check results indicate the retrieved read data is incorrect or otherwise invalid, the disk drive device initiates error recovery processing, including for example, sending an error return to the controller, or other similar error processing actions, as determined by the algorithm downloaded to the low-level storage device.

Figure 5:
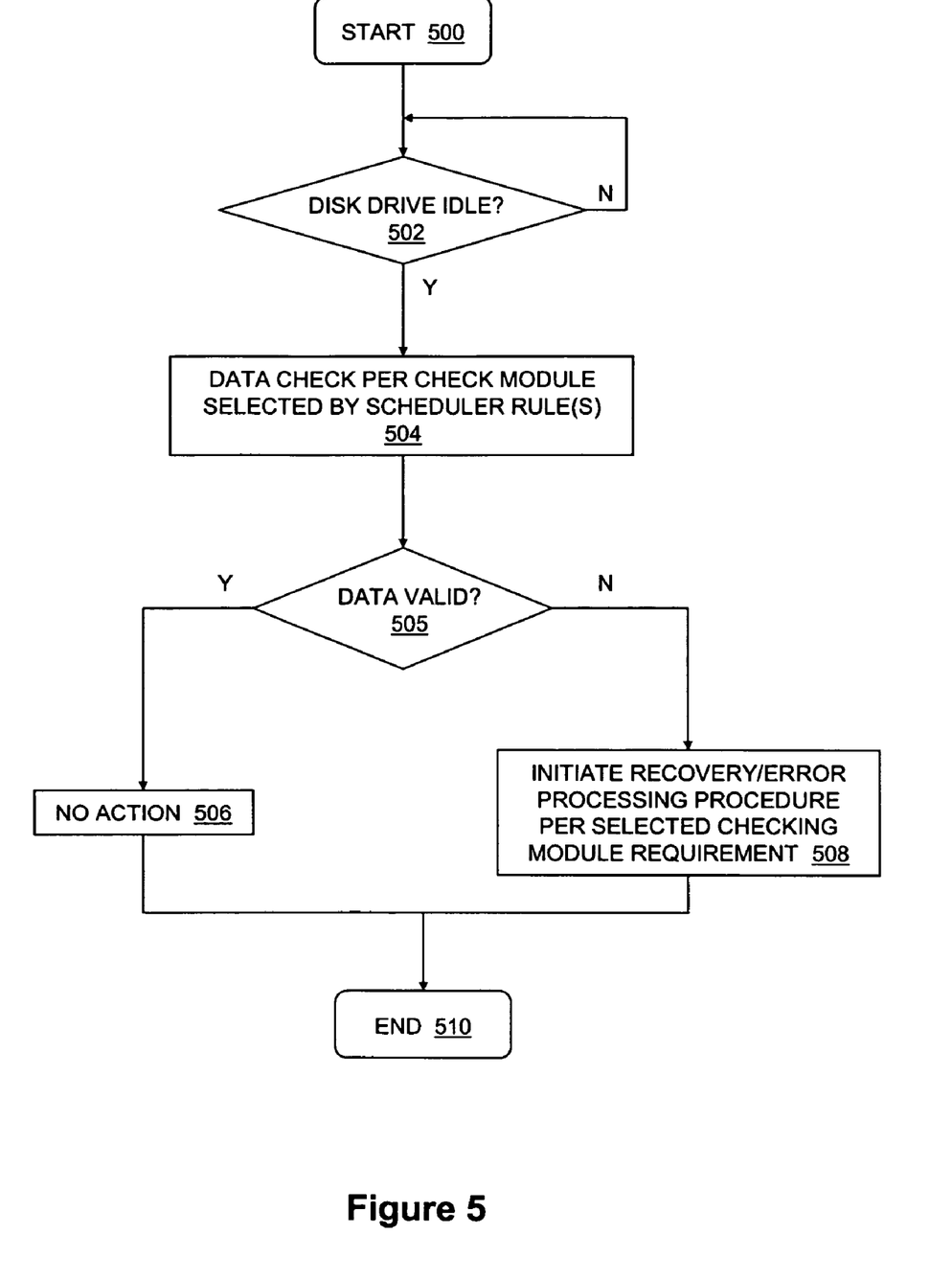
FIG. 5 is a simplified flow diagram illustrating steps performed pursuant to data integrity checking and followup "data scrubbing" during a disk idle time in accordance with one embodiment of the present invention.

Referring to FIG. 5, there is depicted a simplified flow diagram illustrating steps performed pursuant to data integrity checking and followup "data scrubbing" performed during a disk idle time in accordance with one embodiment of the present invention. The process begins as shown at step 500 and proceeds to step 502 with the disk drive device detecting/determining whether or not it is currently in an idle state. Responsive to detecting that the drive is idle (i.e., no current I/O commands being processed by the drive) at step 502, the disk drive initiates a data integrity check on a specified set of data stored on the storage medium disk utilizing one or more checking modules selected from among checking modules 122 in accordance with the requirements of scheduler rules 120 specified for an idle drive operative state (step 504). If, as depicted at steps 505 and 506, the data integrity check results indicate the data is good/valid, no action is taken before the process ends as shown at step 510. If the data check results indicate the data is incorrect, corrupt, or otherwise invalid, the disk drive initiates a data recovery or other error processing procedure as determined by the selected checking module requirements (step 508). Such an error processing procedure may comprise, for example, requesting the host adapter to reject the LBA of the checked data array and save the error indication to be sent to controller storage responsive to a next I/O command from the controller.

In an embodiment employing a Small Computer Serial Interface (SCSI) controller (i.e., embodiment utilizes a SCSI protocol for controller-disk communication), the SCSI specification is suitably altered to implement the scheduling and error checking and recovery functions of the preferred features of the present invention as set forth above. A new SCSI command would allow for the scheduling package containing the checking modules and the scheduling rule set to be transferred to the disk. In a further desirable enhancement to such an embodiment, the disk firmware is enhanced to instruct the disk drive to list the checking regime that has been established in the pages that are returned in response to a SCSI inquiry. It will be clear to one skilled in the art that similar changes may be made to other communication protocols as a means of implementing the preferred features of the most preferred embodiment of the present invention.

It will be appreciated by one of ordinary skill in the art that the method described above will typically be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present, invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using an communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be appreciated that various modifications to the embodiments described above will be apparent to a person of ordinary skill in the art.

What is claimed is:

1. A method for autonomically monitoring data integrity during logical and physical storage and retrieval of data by a storage device, said method comprising: scheduling data checking in accordance with an operative state of the storage device, wherein said scheduling comprises: retrieving an input/output (I/O) command from a device controller; responsive to the I/O command not being marked for prescribed data checking, determining whether a data integrity check is required in association with the I/O command; responsive to determining that a data integrity check is required in association with the I/O command, marking the I/O command as requiring an associated data integrity check; and responsive to determining that a data integrity check is not required in association with the I/O command, executing the I/O command without data checking.

2. The method of claim 1, wherein said determining whether a data integrity check is required in association with the I/O command is preceded by determining whether or not the I/O command is marked for prescribed data checking.

3. The method of claim 2, wherein said determining whether or not the I/O command is marked for prescribed data checking comprises scanning the retrieved I/O command for a token relating to data checking.

4. The method of claim 1, wherein said I/O command is retrieved from a command queue within said device controller.

5. The method of claim 1, wherein said determining whether a data integrity check is required in association with the I/O command comprises examining at least one of a set of one or more scheduler rules stored in communicative association with the storage device, wherein said scheduler rules determine selection of at least one of one or more data checking algorithms in accordance with an operative state of the storage device.

6. The method of claim 1, further comprising selecting at least one data checking algorithm for checking data processed by the marked I/O command, wherein the at least one data checking algorithm is selected in accordance with the operative state of the storage device as determined by the I/O command.

7. A computer program product, residing on a tangible computer usable storage medium, for autonomically monitoring data integrity during logical and physical storage and retrieval of data by a storage device, wherein said computer program product includes computer-executable instructions for performing a method comprising: scheduling data checking in accordance with an operative state of the storage device, wherein said scheduling comprises: retrieving an input/output (I/O) command from a device controller; responsive to the I/O command not being marked for prescribed data checking, determining whether a data integrity check is required in association with the I/O command; responsive to determining that a data integrity check is required in association with the I/O command, marking the I/O command as requiring an associated data integrity check: and responsive to determining that a data integrity check is not required in association with the I/O command, executing the I/O command without data checking.

8. The computer program product of claim 7, wherein said determining whether a data integrity check is required in association with the I/O command comprises examining at least one of a set of one or more scheduler rules stored in communicative association with the storage device, wherein said scheduler rules determine selection of at least one of one or more data checking algorithms in accordance with an operative state of the storage device.

9. The computer program product of claim 7, wherein said method further comprises selecting at least one data checking algorithm for checking data processed by the marked I/O command, wherein the at least one data checking algorithm is selected in accordance with the operative state of the storage device as determined by the I/O command.

10. A storage device for manipulating the logical and physical storage and retrieval of user data on a storage medium, said storage device comprising: a storage and processor unit communicatively coupled between a device controller and the storage medium and adapted to download and store one or more scheduling rules in association with one or more data integrity checking algorithms and to execute the checking algorithms by reference to the scheduling rules; and wherein the scheduling rules determine the timing and type of said checking algorithms to be executed in accordance with an operative state of the storage device.

11. The storage device of claim 10, wherein the scheduling rules select at least one of the one or more checking algorithms based on the storage device processing a data write command.

12. The storage device of claim 10, wherein the scheduling rules select at least one of the one or more checking algorithms based on the storage device processing a data read command.

13. The storage device of claim 10, wherein said storage device is a hard disk drive.

14. The storage device of claim 13, wherein said storage and processor unit are incorporated in communicative contact with said hard disk drive.

15. The storage device of claim 13, wherein the storage medium is a magnetic disk.

16. The storage device of claim 13, wherein the storage and processor unit comprises non-volatile memory within the hard disk drive that stores the one or more scheduling rules and one or more data integrity checking algorithms.

17. The storage device of claim 10, wherein the one or more checking algorithms comprise at least one of ECC, LRC and CRC algorithms.

18. The storage device of claim 10, wherein the one or more scheduling rules comprise rules for selecting at least one from among the stored one or more checking algorithms in accordance with the current operative state of said storage device.

19. The storage device of claim 18, wherein the scheduling rules comprise rules for timing the execution of a selected checking algorithm based on a storage medium idle state.

* * * * *